July 21, 1931.  J. E. SPERRY  1,815,124
AIRPLANE CONSTRUCTION
Filed Sept. 27, 1930   2 Sheets-Sheet 1
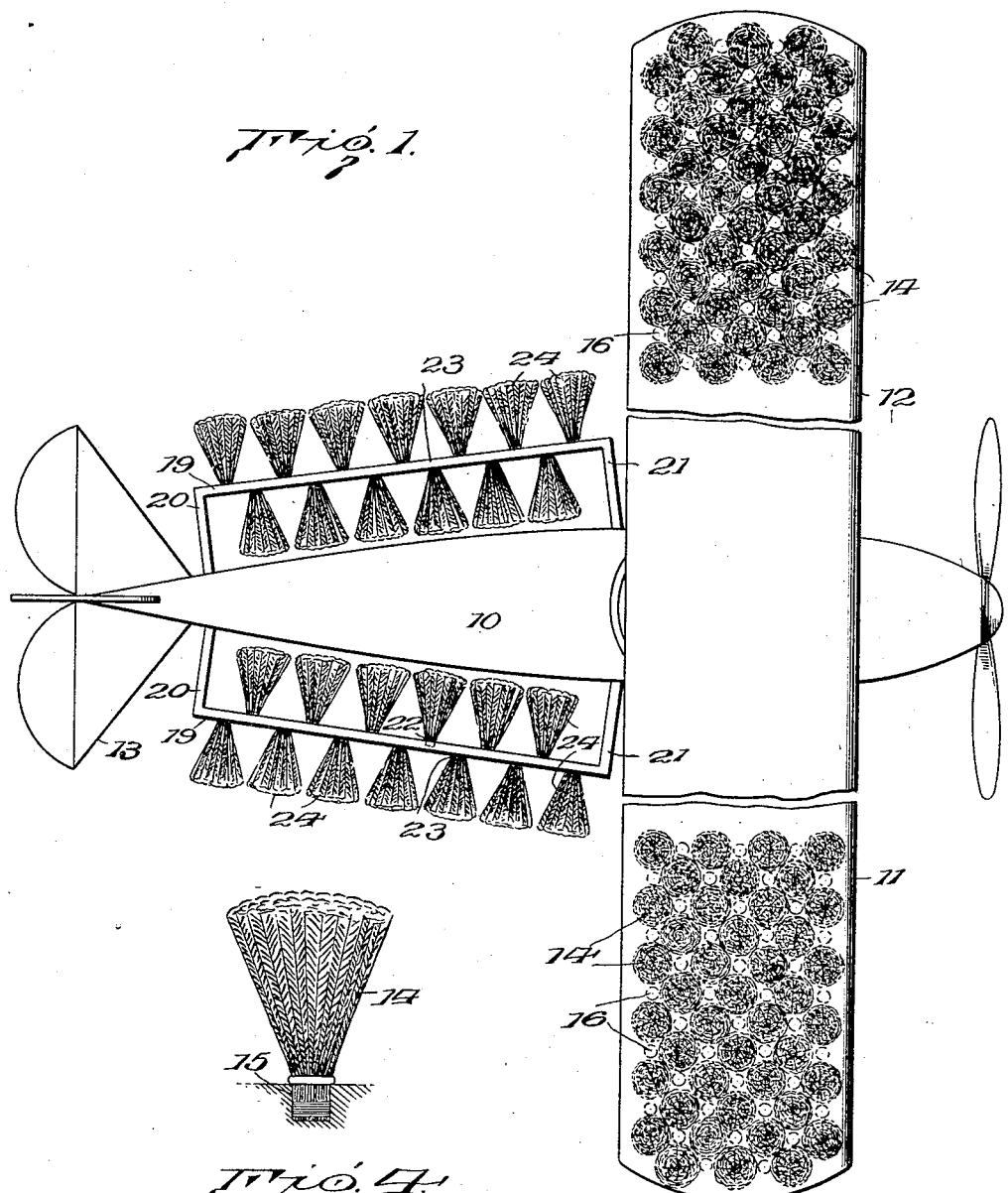

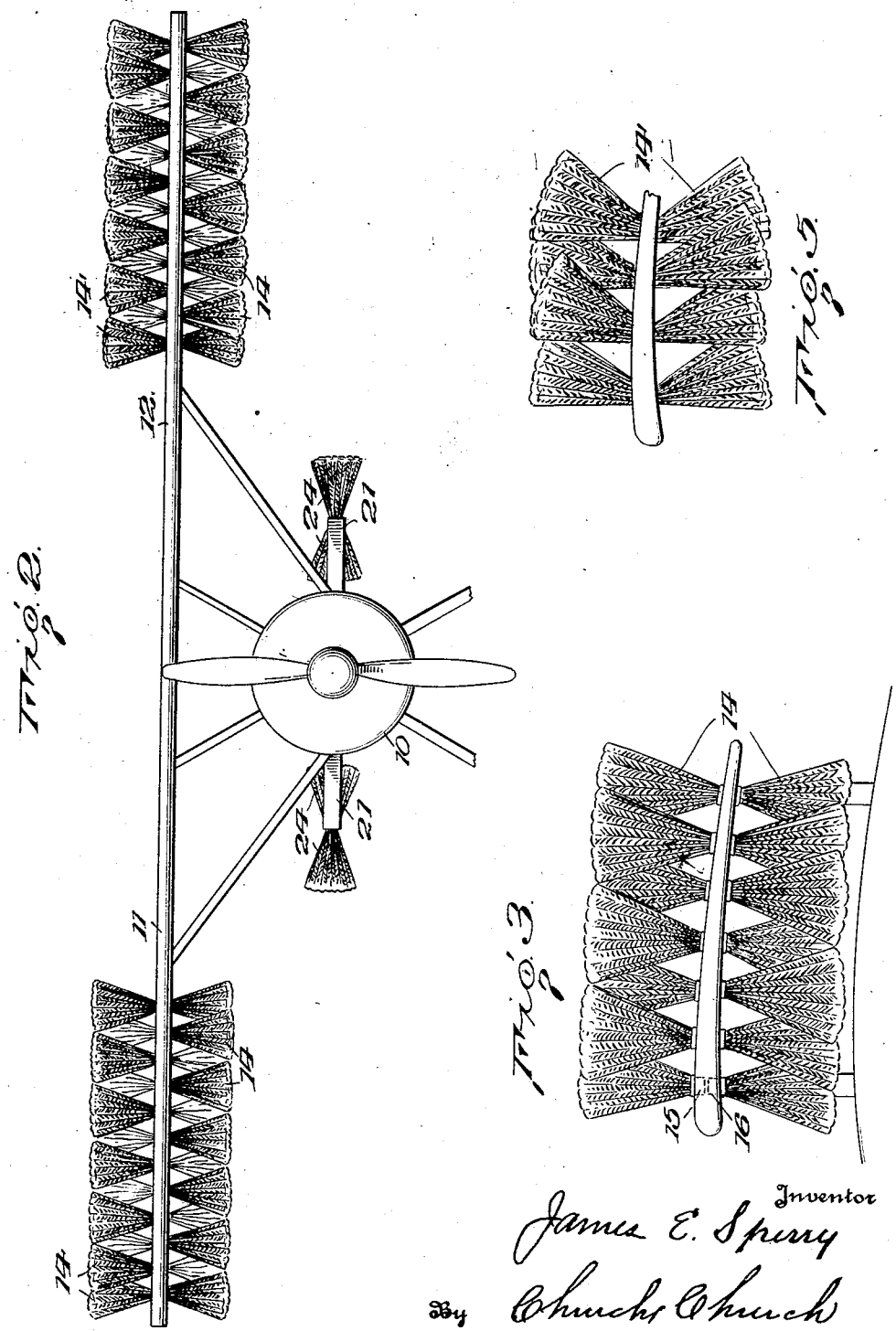

Patented July 21, 1931

1,815,124

UNITED STATES PATENT OFFICE

JAMES E. SPERRY, OF GRESHAM, NEBRASKA

AIRPLANE CONSTRUCTION

Application filed September 27, 1930. Serial No. 484,896.

My invention relates to improvements in airplane construction and has to do, more particularly, with means for increasing the stability thereof when in flight.

The primary object of my invention is to provide novel means by which far greater stability may be provided in an airplane than heretofore attainable.

Another object of my invention is to provide an efficient stabilizing device which may be readily installed on existing airplanes such as monoplanes, biplanes, triplanes, and those having even more wings, regardless of whether they be of the motor propelled or glider type.

Further objects and objects relating to details and economies of construction will definitely appear from the detailed description to follow. In one instance, I accomplish the objects of my invention by the means described in the following specification. My invention is clearly pointed out in the appended claims. An airplane embodying my invention is illustrated, diagrammatically, in the accompanying drawings forming a part of this specification, in which:

Figure 1 is a top plan view of an airplane representing a preferred form of my invention;

Fig. 2 is a front plan view of an airplane representing a preferred embodiment of my invention;

Fig. 3 is a detail end view of one wing of the airplane shown in Fig. 1;

Fig. 4 is a detail sectional view through a portion of one wing showing a socket thereof in which is anchored one of the feather bunches; and Fig. 5 is a fragmentary end view of a modified form of wing in which the feather bunches are rearwardly inclined with respect to the normal direction of flight.

In the drawings, the same reference numerals refer to the same parts throughout the several views.

Probably the most serious problem met with in heaver-than-air craft supported by a plane or planes has been a lack of stability. Decreased air speed, due to shifting air currents, motor failure, or an excessive climbing angle, as well as decreased air pressure encountered in traversing air pockets frequently impairs the stability of an airplane and results in disaster. Numerous solutions have been offered, but, as yet, of those adopted, none has proven completely successful. It is the object of this invention to provide an airplane construction which has greater stability than those now in use, and which is safe even under the adverse conditions mentioned.

In general, my invention consists in providing a novel airfoil construction for airplanes by which the normal lift is increased and greater stability is attained. Broadly, these airfoils consist of a plurality of individual flexible members mounted upon the wing surfaces outside of the direct slip stream of the propeller. Airfoils are also provided upon the sides of the fuselage intermediate the wing and tail of the airplane.

Referring to the drawings, which are illustrative of a preferred form of my invention, the airplane comprises a body portion or fuselage 10, a plane constituting wings 11 and 12, and a tail 13. An airfoil construction is provided on the top and under surfaces of each wing from substantially its midpoint to its tip. Each airfoil comprises a plurality of feather bunches 14 anchored in sockets 15 and 16 formed in the wings. As shown in Fig. 4, each feather bunch 14 resembles a feather duster in that it comprises a large number of feathers of equal length bound together by cloth, wire, or cord wrapped about their quill portions. The remaining portions of each bunch not being bound, are free to flex and expand. The sockets 15 are disposed in the top surface of the wing, whereas the sockets 16 are disposed in the under surface thereof. The sockets are arranged in row formation and preferably alternate, a socket 15 facing upwardly, being adjacent a socket 16 facing downwardly. In this manner the feather bunches 14 may be evenly spaced and securely anchored. Any suitable means such as glue or rubber cement may be employed for holding the butt portions of the feather bunches in the sockets. In the form disclosed in Figs. 1 and 2 the sockets are disposed at right angles to the wing surface and the feather bunches extend directly outwardly therefrom. In flight, however, the feathers are bent back by the air and offer but little resistance thereto. In the form shown in Fig. 5 the feather bunch sockets in the wing are disposed at an acute angle to the wing surface, and the feather bunches 14 are thus initially rearwardly inclined in addition to the inclination effected by air pressure.

Extending along each side of the fuselage 10, intermediate each of the wings 11 and 12 and tail 13, is provided an auxiliary wing or fin. Each of these wings comprises a frame member 19 having a pair of supporting arms 20 and 21. The central portion of the frame member is formed with sockets 22 which face toward the fuselage, and sockets 23 which face away from the airplane. These sockets alternate and are arranged in a single row. Mounted in the sockets 22 and 23 are feather bunches 24, similar to those 14 of the main wings. The relative length of the arms 20 and 21 and the feather bunches 24 disposed in the sockets 22 is such that the feather bunches 24 terminate somewhat short of the fuselage, thus providing an air space therebetween and permitting free flexing of the feathers.

While the airplane is in flight, the feather bunches 14 are bent back and function to materially increase the lift upon the wings 11 and 12. Because the feathers are out of the direct slip stream of the propeller and are free to bend rearwardly, there is but a slight increment of air friction or "drag" over that inherent to a bare wing of the same dimensions. The feather bunches 24 along the fuselage are also bent rearwardly in flight, but upon decreased velocity, or in traversing air pockets they spread and assume a posture approximating perpendicularity to the fuselage 10, thus increasing the total effective supporting plane surface of the airplane. The side wings constituted by the feather bunches 24 also serve the function of vanes and steady the airplane in its course.

While I have disclosed and described an airfoil construction employing bunches of bird feathers, it is to be understood that equivalent means are contemplated as substitutes therefor. Feather-like members formed of sheet aluminum, rubber, or fiber, stiff paper or cloth, and other materials might be used to equal advantage.

While I have shown the invention as applied to a monoplane, it is to be understood that airplanes having any number of wings may be similarly equipped, and to equal advantage. Further, in the case of large planes, the size and number of auxiliary wings placed along the fuselage may be increased.

I am aware that the construction herein disclosed may be varied considerably without departing from the spirit of my invention. I, therefore, claim my invention broadly, as indicated by the appended claims.

What I claim is:

1. In an airplane having a body portion and a wing extending outwardly from each side thereof, airfoils on said wings adjacent their tips, each airfoil comprising bunches of feathers secured to, and arranged in row formation on the wing surfaces.

2. In an airplane having a body portion and a wing extending outwardly from each side thereof, airfoils on said wings adjacent their tips, each airfoil comprising bunches of feathers secured to and arranged in row formation on the top and under surfaces of the wings.

3. In an airplane having a body portion and a wing extending outwardly from each side thereof, airfoils on said wings adjacent their tips, each airfoil comprising bunches of feathers arranged in row formation upon the wing and anchored in sockets formed in the wings.

4. In an airplane having a body portion and a wing extending outwardly from each side thereof, airfoils on said wings adjacent their tips, each airfoil comprising bunches of feathers arranged in row formation upon the wing surfaces, said feathers being so mounted upon the wings as to extend rearwardly and outwardly from the wing surfaces when the airplane is in flight.

5. In an airplane having a body portion and a wing extending outwardly from each side thereof, airfoils on said wings adjacent their tips, each airfoil comprising bunches of feathers secured to and arranged in row formation on the top and under surfaces of said wings, the bunches in each row extending alternately upwardly and downwardly from said wings.

6. In an airplane having a body portion and a wing extending outwardly from each side thereof, said wings having sockets formed in their top and under surfaces adjacent their tips and said sockets being arranged in row formation with the sockets of each row formed alternately in the top and under surfaces of the wings, and airfoils for said wings comprising bunches of feathers having their butt ends anchored in said sockets and having their exposed portions flared outwardly.

7. In an airplane having a fuselage, a pair of wings, and a tail, stabilizing means therefor comprising an auxiliary wing disposed along each side of the fuselage intermediate a wing and the tail, each auxiliary wing comprising a frame in which are supported horizontally disposed bunches of feathers.

8. In an airplane having a fuselage, a pair of wings and a tail, stabilizing means therefor comprising an auxiliary wing disposed along each side of the fuselage intermediate a wing and the tail, each auxiliary wing comprising a frame extending lengthwise along the fuselage and secured thereto, sockets in said frame, and a bunch of feathers in each socket, the feather bunches extending alternately toward and away from the fuselage.

JAMES E. SPERRY.